Dec. 7, 1926.

W. L. POLLARD 1,609,307

AUTOMOBILE INCLOSURE

Filed June 23, 1921    4 Sheets-Sheet 1

Inventor:
Willard L. Pollard
By
Jones, Addington, Ames & Seibold Attys

Dec. 7, 1926.

W. L. POLLARD 1,609,307

AUTOMOBILE INCLOSURE

Filed June 23, 1921 4 Sheets-Sheet 2

Inventor:
Willard L. Pollard
By Jones, Addington, Ames & Seibold Attys

Dec. 7, 1926. 1,609,307
W. L. POLLARD
AUTOMOBILE INCLOSURE
Filed June 23, 1921 4 Sheets-Sheet 3
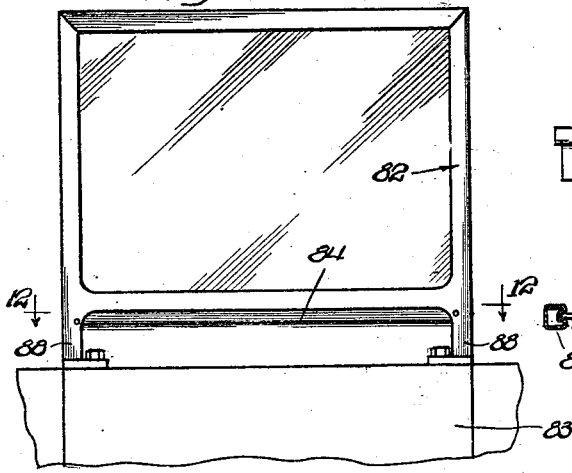
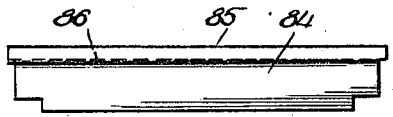
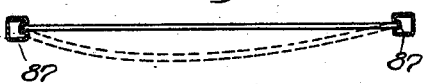
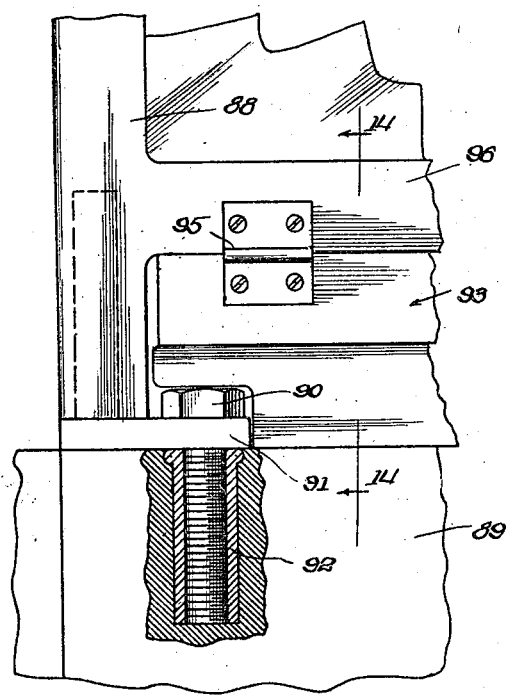
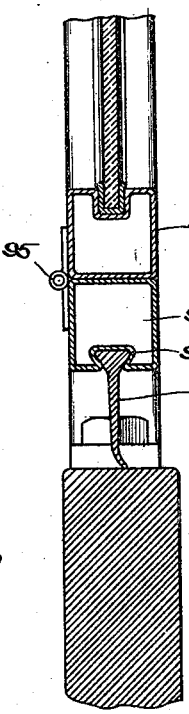
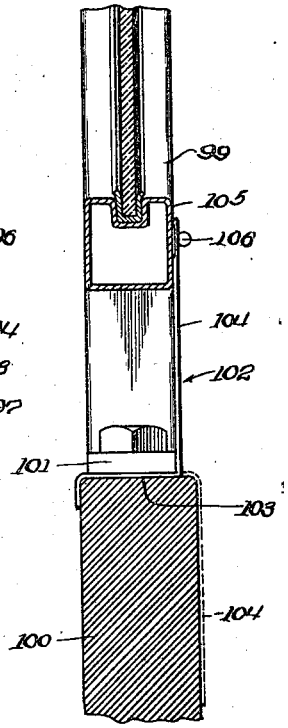
Inventor:
Willard L. Pollard
By Jones, Addington, Ames & Seibold Attys.

Dec. 7, 1926.
W. L. POLLARD
1,609,307
AUTOMOBILE INCLOSURE
Filed June 23, 1921    4 Sheets-Sheet 4
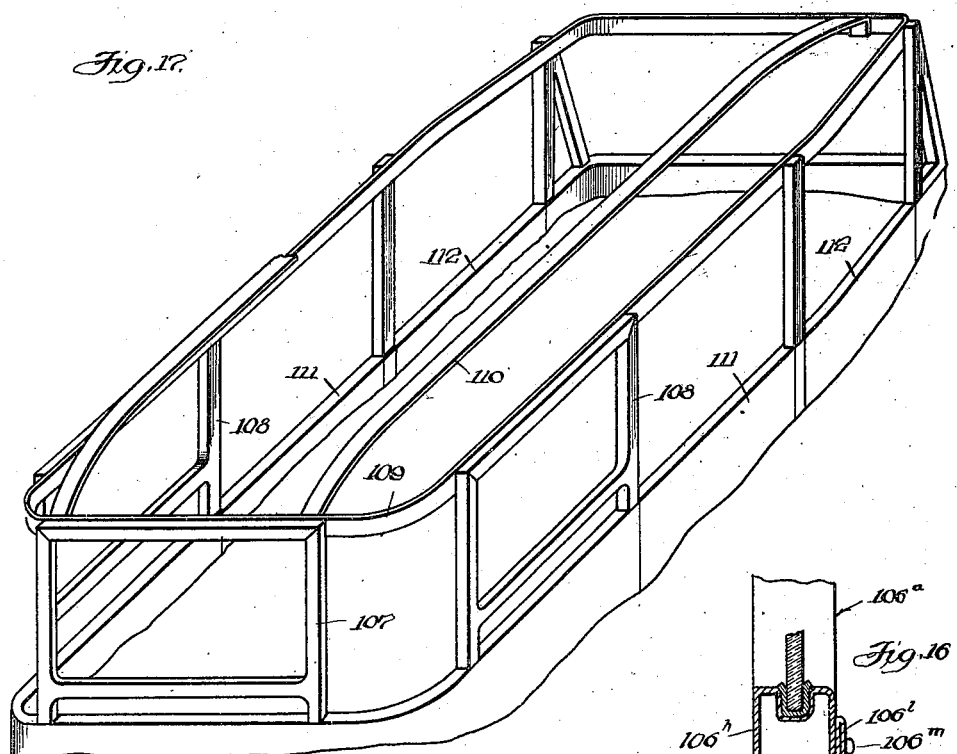
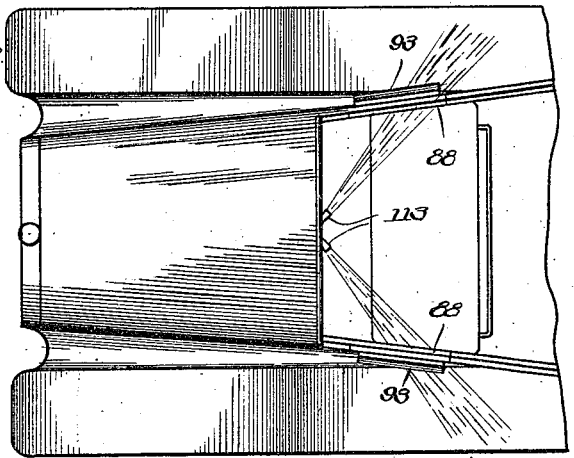
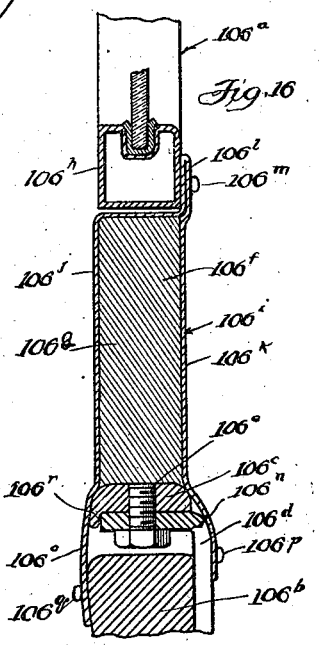
Inventor:
Willard L. Pollard Patented Dec. 7, 1926.

1,609,307

UNITED STATES PATENT OFFICE.

WILLARD L. POLLARD, OF EVANSTON, ILLINOIS, ASSIGNOR TO AIR-TITE AUTO TOP COMPANY, OF CHICAGO, ILLINOIS, A CORPORATION OF ILLINOIS.

AUTOMOBILE INCLOSURE.

Application filed June 23, 1921. Serial No. 479,727.

My invention relates to automobile inclosures.

One of the objects of my invention is to provide an improved inclosure which can be easily changed to make the car suitable for use either in summer or winter.

A further object of my invention is to provide an improved inclosure in which ample provision is made for ventilation.

A further object of my invention is to provide a frame for use in constructing an inclosure for automobiles, which is "universal" and can be readily cut to fit any width of door and any height of top.

Further objects will appear from the detailed description to follow and from the appended claims.

In the drawings in which several embodiments of my invention are shown—

Fig. 10 is a side elevation showing a different form of ventilation closure;

Fig. 11 is a side elevation showing the curtain used in Fig. 10;

Fig. 12 is a section on the line 12—12 of Fig. 10;

Fig. 13 is a detail side elevation showing another form of ventilation closure;

Fig. 14 is a section on the line 14—14 of Fig. 13;

Fig. 15 is a vertical sectional view showing another form of ventilation closure;

Fig. 16 is a vertical sectional view showing another form of ventilation;

Fig. 17 is a perspective view showing the frame construction of an enclosure placed on an automobile;

Fig. 18 is a plan view showing a direction signalling construction; and

Figure 1:
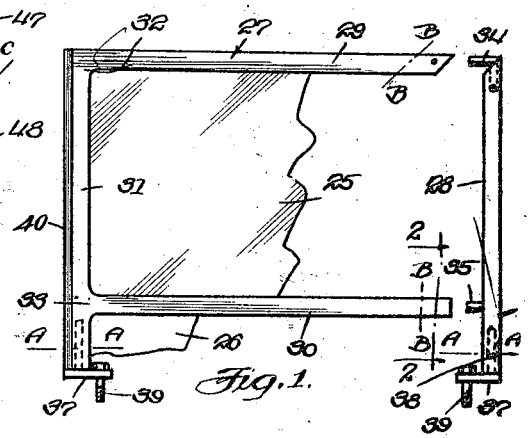
Figure 1 is a side elevation showing a universal frame for use in constructing an inclosure for automobiles.
Figure 2:
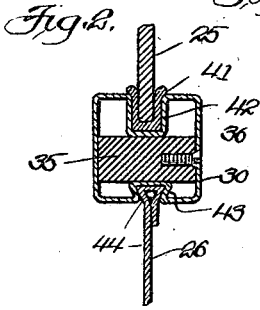
Fig. 2 is a section on the line 2—2 of Fig. 1.

The construction shown in Figs. 1 and 2 is a steel frame to be secured to the door of an automobile, in the upper portion of which is mounted a pane of glass 25, and in the lower portion of which is mounted a ventilation panel 26, which may be of flexible fabric material if desired. This frame comprises an integral frame member 27, having frame bars which receive three edges of the pane of glass 25 and the two edges of the ventilation panel 26, and a second integral frame member 28 which receives the fourth edge of the pane of glass, and another edge of the ventilation panel. This provides a strong rigid construction which will withstand the jarring and vibration to which the panel as a whole is subjected. The frame parts 27 and 28 may be made of channel steel tubing of substantially the cross-section shown in Fig. 2, the upper and lower frame bars 29 and 30 being welded to the vertical frame bar 31 as indicated at 32 and 33, to provide an integral construction for the frame member 27. The upper end of the frame member 28 may be secured to the upper frame bar 29 by means of an angle clip 34, one leg of which is inserted within the frame member 28, and the other leg of which is inserted within the tubular frame bar 29. The lower frame bar 30 may be secured to the vertical frame member 28 by means of a clip or bracket 35, one end of which may be welded to the vertical frame member 28, which may be inserted within the tubular frame bar 30, and secured therein by means of a screw 36, as indicated at Fig. 2.

The entire panel may be mounted on the door of a car by means of a pair of L-shaped brackets 37, which may be malleable castings, one leg 38 of the L-shaped brackets extending up within the tubular frame bars 28 and 31 respectively, and the other leg of the bracket having a hole therethrough to receive the cap screw 39, by means of which the bracket may be secured to the door. Suitable screw-threaded sockets may be inserted in the doors for the reception of these screws 39, as will be described more in detail hereinafter.

In order to provide a weathertight engagement with the adjacent panel, a rubber sealing strip 40 may be inserted in the panel of the vertical frame member 31. As shown in Fig. 2 the glass pane 25 may be seated in a rubber channel strip seated in the upper channel portion 42 of the frame bar 30, and the ventilation panel 26 may be secured in the lower channel 43 of the frame bar 30. For this purpose a sort of curtain rod 44 is inserted in a seam portion in the upper edge of the ventilation curtain 26, and the curtain with the curtain rod in place is slipped into the lower channel 43 in the horizontal frame bar 30 sidewise from the ends of the frame bar, before the two frame members 27 and 28 are assembled.

Figure 3:
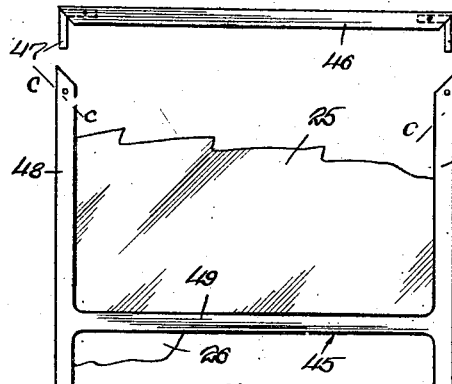
Fig. 3 is a side elevation showing another form of frame.

The construction shown in Fig. 1 is a "universal" panel, in that it can be made up in stock, and cut to fit both as to height and width. To fit the frame for height, all that is necessary to do is to cut off the legs of the frame as indicated by the section lines A—A to secure any desired height of the panel. In order to fit the frame for width, all that is necessary to do is to cut off the horizontal frame bars 29 and 30 along the section lines B—B, to make the panel any width desired. It will be seen that this cutting off along the section lines A—A and B—B does not interfere with the fitting together of the frame parts, as the L-shaped foot bracket 37 can be inserted into the legs just as well after they are cut off as before, and the angle clips 34 and clip or bracket 35 can be inserted into the horizontal frame bars 29 and 30 just as well after they are cut off as before. The horizontal frame bars 29 and 30 are spaced apart a distance sufficient to properly receive a standard width of pane of glass which can be cut off of its end to fit it to any desired width of panel. By this construction a universal panel is provided which is made large enough for any style of car and which can be cut to fit any desired height and width. In Fig. 3 is shown a panel which can be cut to any desired height, but not width. In this form, a frame is provided, in the upper part of which the pane of glass 25 is received, and in the lower part of which the ventilation panel 26 is received. This two-part frame comprises a lower frame member 45, the upper portion of which receives three sides of the pane of glass 25, and the lower portion of which receives three sides of the ventilation panel 26, and an upper frame member 46 which receives the upper edge of the pane of glass 25. The upper member 46 is secured to the lower member 45 by means of angle clips 47, the vertical legs of which are insertable within the tubular vertical frame bars 48 of the lower member 45, and the horizontal legs of which are insertable within the upper frame member 46. The lower horizontal frame bar 49 may be welded at its end to the vertical frame bars 48 whereby a substantial, rigid construction is secured.

This frame can be fitted to any height, simply by cutting off the vertical frame bars 48 as indicated by the section lines C—C.

In the construction shown in both Figs. 1 and 3, the angle clips 34 and 47 may be secured to the frame members by means of screws extending through holes in the frame members and threaded into the angle clips.

Figure 4:
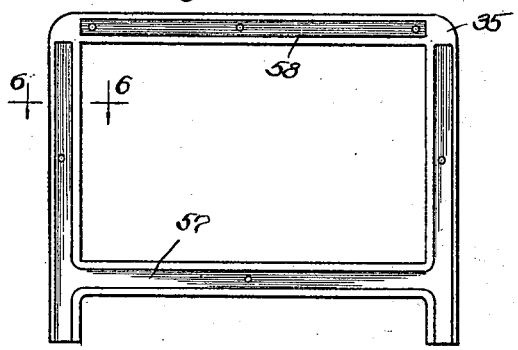
Fig. 4 is a side elevation showing the finishing portion of another form of frame.
Figure 5:
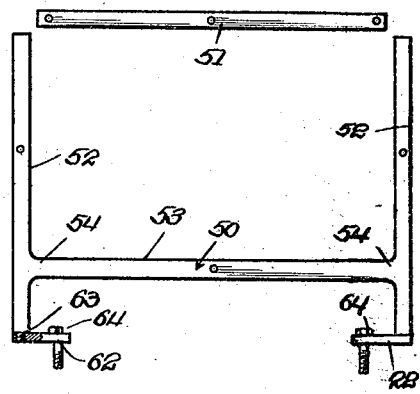
Fig. 5 is a side elevation showing the interior supporting frame used with the construction shown in Fig. 4.
Figure 6:
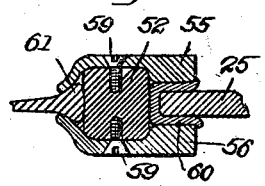
Fig. 6 is a section through the assembled frame corresponding to the construction shown in Figs. 4 and 5 substantially on the line 6—6 of Fig. 4.

In Figs. 4, 5, and 6 is shown a different form of frame construction, comprising an internal supporting frame-work, and inner and outer finishing castings which are secured to the internal supporting frame.

The internal supporting frame is shown in Fig. 5, and comprises a lower member 50, the upper portion of which receives three sides of the pane of glass, and the lower portion of which receives three sides of the ventilation panel, and an upper frame member 51, which supports the upper edge of the glass. These frame members 50 and 51 may be of steel bars, the lower frame member 50 comprising two vertical portions 52, welded to the horizontal portion 53 at 54, to provide a strong rigid construction.

In order to provide a channel in which to seat the edges of the glass 25, and in order to provide a finished appearance to the frame, inner and outer finishing and supporting frame members 55 and 56 are provided, the cross-section of which is shown in Fig. 6. Each of these finishing members 55 is provided with an H-shaped channel portion 57 to receive the lower frame member 50, and with a straight channel portion 58 to receive the upper frame member 51. These finishing frame members 55 and 56 may be secured to the supporting frame by means of a number of screws 59 (Fig. 6).

As shown in Fig. 6, the cross-section of these finishing frame members 55 and 56 is such that when they are secured to the supporting frame they form, together with the supporting frame, a channel in which may be seated a channel-shaped piece of rubber 60, in which the edge of the pane of glass 25 is seated, and such that they also form a channel to receive a rubber weather-strip 61, which may be used to make a sealing engagement with the adjacent panel.

The frame may be secured to the door of the car by means of brackets or clips 62, having tapped openings to receive the lower threaded end 63 of the vertical frame-bar 52, and having holes through which the cap screws 64 may be inserted to be screwed into sockets in the door.

Figure 7:
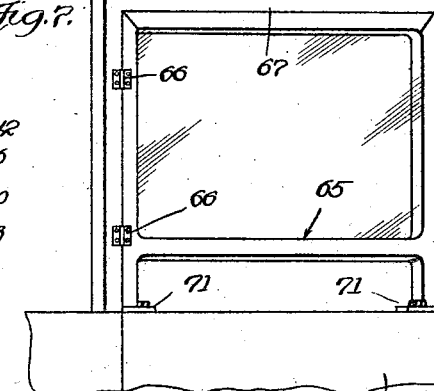
Fig. 7 is a perspective view showing a frame construction which can be swung up against the roof of a car.

In Fig. 7 I have shown a panel 65 similar to the panels shown in Figs. 1, 3 and 5, this panel 65 being hinged at 66 to an L-shaped frame 67, which L-shaped frame 67 is hinged as indicated at 68 to the outside edge of the top 69 of the automobile, so that the L-shaped frame 67 carrying with it the panel 65, may be swung up to the dotted line position indicated against the roof or top 69 of the car where it will be out of the way. When the L-shaped frame 69 is swung down into the full line position shown, the panel 65 may be secured to swing with the door 70, by means of brackets 71, similar to the brackets 37 previously described.

Figure 8:
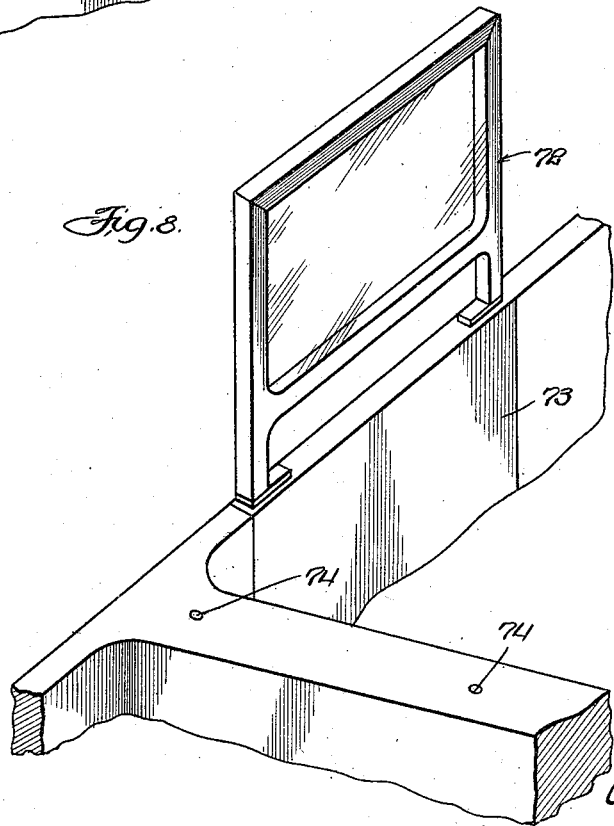
Fig. 8 is a perspective view showing one of the frames mounted on a portion of the car.

In Fig. 8 is shown a construction in which a panel 72 similar to the panels shown in Figs. 1, 3 and 5, is provided with means whereby it may either be mounted on the door 73 of the car, or may be removed and secured by means of the sockets 74 in a position where it will extend transversely across behind the front seat and in front of the rear seat, where it may serve as a tonneau shield.

Figure 9:
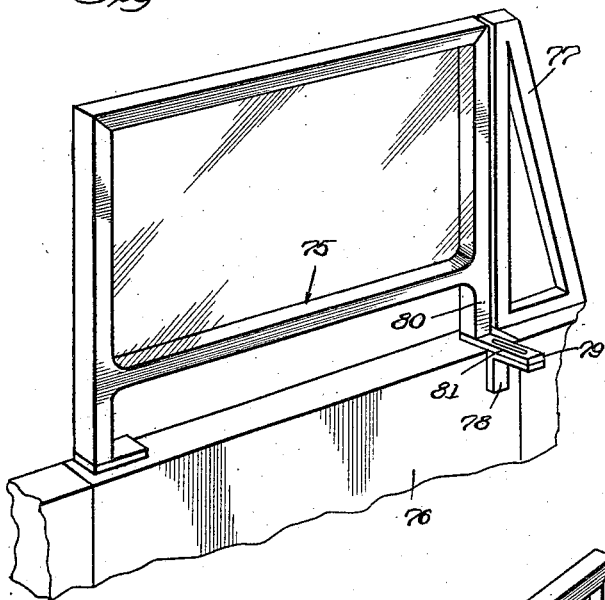
Fig. 9 is a perspective view showing still another manner of mounting one of the frames.

In Fig. 9 is shown a construction in which a frame 75, similar to the frames previously described may be mounted on a front door 76, just in the rear of the triangular panel 77, which is in the rear of the front windshield, this panel 75 being provided with means whereby the front end may be adjusted in and out to provide a ventilation opening between the panel 75 and the triangular panel 77.

This means for adjustment may comprise an angle bracket 78 secured to door 76, and having a slot in its horizontal leg, and an angle bracket 79, one end of which extends up into the vertical leg 80 of the frame 75, and the other of which is slotted as indicated at 81 so that securing means can be inserted through the two adjacent slotted portions to hold the front edge of the panel 75 in various positions of in and out adjustment.

In Fig. 10 is shown a frame 82, similar to the frame previously described, mounted on a door 83, and provided with a ventilation panel 84 of a different type than previously described. This ventilation panel 84 may be made of fabric having a seam 85 in its upper edge, to receive a flexible steel curtain rod 86, whereby the ventilation panel may be sprung into place as indicated in Fig. 12, the ends of the curtain rod 86 entering the channels 87 in the vertical frame members 88.

In Figs. 13 and 14 is shown a construction in which a frame 88, similar to the frame previously described, is secured to the door 89, by means of a cap screw 90, extending through an opening in the foot bracket 91 and threaded into the tapped socket 92 which is mounted in the door 89. In this construction, the ventilation panel 93 comprises a tubular bar 94, hinged at 95 to the horizontal frame-bar 96, and a rubber sealing strip 97, mounted in the channel portion 98 of the swinging frame-bar 94. In this form, if ventilation is desired, the frame-bar 94 can be simply pushed outwardly and swung upwardly alongside the frame-bar 96 so that ventilation will be provided underneath the frame-bar 96.

In Fig. 15 is shown still another form of ventilation panel. In this construction a frame 99, similar to the frames previously described, is mounted on the door 100, by means of angle brackets 101, and a ventilating curtain 102 has a portion 103 secured to the upper edge of the door 100, and has a flat portion 104, which can be buttoned on the horizontal frame bar 105, as indicated at 106, or can be dropped down to the dotted line position just inside of the car door.

In Fig. 16 is shown still another form of ventilation panel. In this construction, a frame 106$^a$, similar to the frames previously described is mounted on the door 106$^b$, by means of angle brackets 106$^c$, (secured to the frame 106$^d$ in the manner previously described), and angle clips 106$^d$, to which the angle brackets 106$^c$ are secured by means of cap screws 106$^e$. The angle clips 106$^d$ may be secured to the door 106$^b$ by screws or in any suitable manner.

In this construction the ventilation panel 106$^f$ comprises a wooden strip or board 106$^g$ of a size to substantially fit the opening underneath the frame-bar 106$^h$, and a covering 106$^i$ of imitation leather or similar fabric, secured to the board 106$^g$. This fabric covering 106$^i$ may be made of a single integral piece of fabric to provide an outer finishing covering 106$^j$, and an inner finishing covering 106$^k$. A portion of the fabric may be doubled and extended upwardly as indicated at 106$^l$, and secured to buttons 106$^m$ on the frame-bar 106$^h$, to provide a sealing connection at this point, and to hold the upper edge of the ventilation panel in place. The fabric 106$^i$ may extend downwardly beyond the panel 106$^f$ both inside and outside, to form flaps 106$^n$ and 106$^o$, and these flaps may be secured to buttons 106$^p$ and 106$^q$ respectively, secured to the angle clips 106$^d$ and door 106$^b$ respectively. In this manner a weathertight joint is obtained between the panel and door, and the supporting bracket 106$^c$ and clips 106$^d$ are also concealed from view.

The angle bracket 106$^d$ may be provided with a downwardly extending flange portion 106$^r$ which will conceal the end of the angle clip 106ᵃ when the ventilation panel 106ᶠ is removed.

In Fig. 17 is shown somewhat diagrammatically in perspective a top construction for automobiles in which a panel 107, similar to the panels previously described, is used at the rear end of the top construction, and in which the panels 108 similar to the panels previously described are used for the rear side construction. These panels are constructed to receive panes of glass, and ventilation panels, just as the panels previously described. These panels 107 and 108 may serve to help support an upper frame construction 109 and 110, on which the top construction may be mounted. Frames similar to the frame just described may be mounted on the doors 111 and 112.

In Fig. 18 is shown a direction signalling construction which may be used with the panel shown in Fig. 13. In this construction, frames 88, like that shown in Fig. 13, are mounted on the front doors of the car, and lamps 113 are mounted so that they will throw beams of light from the inside to the outside of the car when the ventilation panels 93 are swung outwardly. In this construction if the driver is driving at night, and wants to turn in one direction or the other, he raises the curtain on the corresponding side and permits the rays of light from the lamp 113 to project to the outside of the car.

Figure 19:
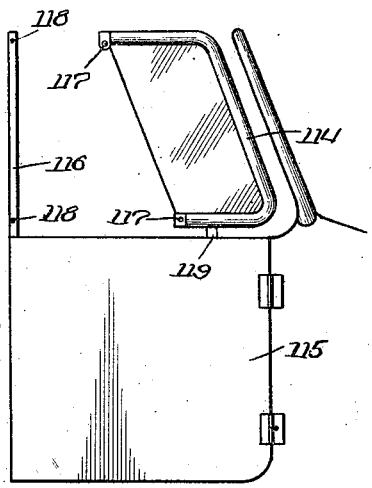
Fig. 19 is a side elevation showing a side wing mounted on a door with provision for ventilation.

In Fig. 19 is shown a construction in which a windshield 114 is mounted on the hinged front door 115 of the car, in which provision is made whereby a curtain may be stretched from the rear edge of the windshield to a vertical post 116 secured to the rear edge of the door. In this form of construction buttons 117 may be secured to the windshield 114 and buttons 118 may be secured to the vertical post 116 and the curtain may be stretched between the post and windshield and secured to these buttons 117 and 118. If desired, the windshield 114 may be mounted so as to be adjusted pivotally about a vertical axis on the pin 119.

What I claim as new and desire to secure by Letters Patent of the U. S. is:

1. A door construction for automobiles comprising a body portion having a substantially horizontal upper edge a pane of glass above said edge and spaced therefrom, a ventilation panel between said glass pane and edge, and a frame in which said pane and panel are mounted, said pane and panel being substantially rectangular, said frame comprising a first integral portion which receives three edges of the pane and two edges of the panel, and a second integral portion which receives the fourth edge of the pane, and an edge of the panel.

2. A door construction for automobiles comprising a body portion having a substantially horizontal upper edge, a rectangular pane of glass above said edge and spaced therefrom, a ventilation panel between said glass pane and edge, and a frame in which said pane and panel are mounted, said frame comprising a rectangular portion surrounding said pane, and legs extending downwardly from said frame and embracing said ventilation panel, said legs being tubular, and means for securing said frame to said door comprising bracket members extending into said tubular leg portions.

3. A door construction for automobiles comprising a body portion having a substantially horizontal upper edge, a rectangular pane of glass above said edge and spaced therefrom, a ventilation panel between said glass pane and edge, and a frame in which said pane and panel are mounted, said frame comprising a rectangular portion surrounding said pane, and legs extending downwardly from said frame and embracing said ventilation panel, said legs being tubular, and means for securing said frame to said door comprising bracket members extending into said tubular leg portions, said brackets having horizontally extending feet, and vertically extending screws for securing said feet to said door.

4. The combination with an automobile having a side enclosure, having an opening therein, a manually operable closure for said opening, and a light for directing a beam toward said opening, whereby when said closure is opened a beam of light will be transmitted through said opening to give a signal.

In witness whereof, I have hereunto subscribed my name.

WILLARD L. POLLARD.